United States Patent
Su et al.

(10) Patent No.: US 7,616,358 B2
(45) Date of Patent: Nov. 10, 2009

(54) DOUBLE-SIDE SCAN DEVICE WITH MOVABLE IMAGE SCAN MODULE

(75) Inventors: Yu-Jen Su, Taipei (TW); Hsun-Hao Chan, Hsinchu County (TW); Shu-Ya Chiang, Tai-Chung (TW); Liang-Qing Su, Kaohsiung County (TW); Kai-Lun Lee, Miao-Li (TW); I-Chung Hou, Hsin-Chu (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 11/934,785

(22) Filed: Nov. 5, 2007

(65) Prior Publication Data
US 2008/0291512 A1  Nov. 27, 2008

(30) Foreign Application Priority Data
May 22, 2007  (TW) .............................. 96118172 A

(51) Int. Cl.
*H04N 1/04* (2006.01)

(52) U.S. Cl. ...................... 358/498; 358/496; 358/474; 358/408; 399/367; 399/374; 399/364

(58) Field of Classification Search ................. 358/496, 358/498, 408, 497, 474; 399/367, 374, 364; 355/23, 24
See application file for complete search history.

(56) References Cited

U.S. PATENT DOCUMENTS

| | | | | |
|---|---|---|---|---|
| 5,055,880 A | * | 10/1991 | Fujiwara | 399/203 |
| 5,091,755 A | * | 2/1992 | Tashiro | 399/374 |
| 5,121,912 A | * | 6/1992 | Tashiro | 271/3.05 |
| 5,257,064 A | * | 10/1993 | Okamoto | 355/24 |
| 2006/0291012 A1 | * | 12/2006 | Katayama et al. | 358/498 |

* cited by examiner

*Primary Examiner*—Cheukfan Lee
(74) *Attorney, Agent, or Firm*—Kile Goekjian Reed & McManus PLLC

(57) ABSTRACT

A double-side scan device for performing a single-side scan operation or a double-side scan operation selectively includes a document conveyer, a first transparent device, a second transparent device, and an image scan module. The image scan module moves to one side of the first transparent device to capture an image of one surface/side of a document and moves to one side of the second transparent device to capture an image of the other surface/side of the document, respectively.

17 Claims, 4 Drawing Sheets

DOUBLE-SIDE SCAN DEVICE WITH MOVABLE IMAGE SCAN MODULE

BACKGROUND OF THE INVENTION

1. Field of the Invention

The present invention relates to a double-side scan device, and more particularly, to a double-side scan device capable of reversing a document to perform a double-side scan operation, and having a movable image scan module for performing a single-side scan operation or the double-side scan operation selectively.

2. Description of the Prior Art

When using a single-side scan device to scan two sides of a sheet of paper, it is required to reverse the paper manually after one side or surface is scanned, in order to scan the other side. This single-side scan operation is slow, and also has a difficulty of conveying the paper in different directions. Thus, a double-side scan device developed by prior art can automatically scan two sides (surfaces) of the paper, and the two sides of the paper can be scanned quickly, and the problem of conveying the paper in different directions can be solved.

A conventional design uses two scan modules to respectively scan the two sides of the paper in the double-side scan device, such as U.S. Pat. No. 4,536,077 and No. 5,680,204, but this design results in a large volume of the double-side scan device and high cost with the two scan modules. Thus, a design for reversing the paper to perform the double-side scan operation is provided, such as U.S. Pat. No. 5,430,536, which uses an interlacing path to connect an entrance section and an exit section of a paper conveying path. When a first surface or side of the paper is printed or scanned, a paper conveyer will move the paper back to the interlacing path, and the paper will return to the paper conveying path from the interlacing path to print or scan the second surface or side. However, this design requires the paper to repeatedly travel through the whole paper conveying path so that the moving path becomes longer and takes more time. Furthermore, the order of the papers will be reversed at the paper exit tray, and the user must re-collate the papers.

Additionally, U.S. Pat. No. 5,438,435 discloses a double-side scan operation scheme. However, it has some drawbacks of having a complex document conveying path and requiring a precision paper guiding control device to prevent the paper from moving in the wrong path or getting jammed. Since the document conveying path is complex, there are many necessary paper conveying elements, and the above double-side scan operation scheme suffers from high manufacturing cost.

SUMMARY OF THE INVENTION

It is therefore one of the objectives of the present invention to provide a double-side scan device capable of reversing a document to perform a double-side scan operation, and having a movable image scan module for performing a single-side scan operation or the double-side scan operation selectively to solve the above problems.

According to an embodiment of the present invention, a double-side scan device is disclosed. The double-side scan device includes: a document conveyer, comprising a document track, and the document track comprising a first scan area, a second area, and a circumrotating area; a first transparent device, disposed in the first scan area of the document track, wherein the first surface of the document faces the first transparent device when the document conveyer conveys the document through the first scan area; a second transparent device, disposed in the second scan area of the document track, wherein the second surface of the document faces the second transparent device when the document conveyer conveys the document through the second scan area after the document passes the circumrotating area; and an image scan module, disposed in the double-side scan device with a movable scheme, wherein the image scan module moves to one side of the first transparent device to capture the image of the first surface of the document and moves to one side of the second transparent device to capture the image of the second surface of the document respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
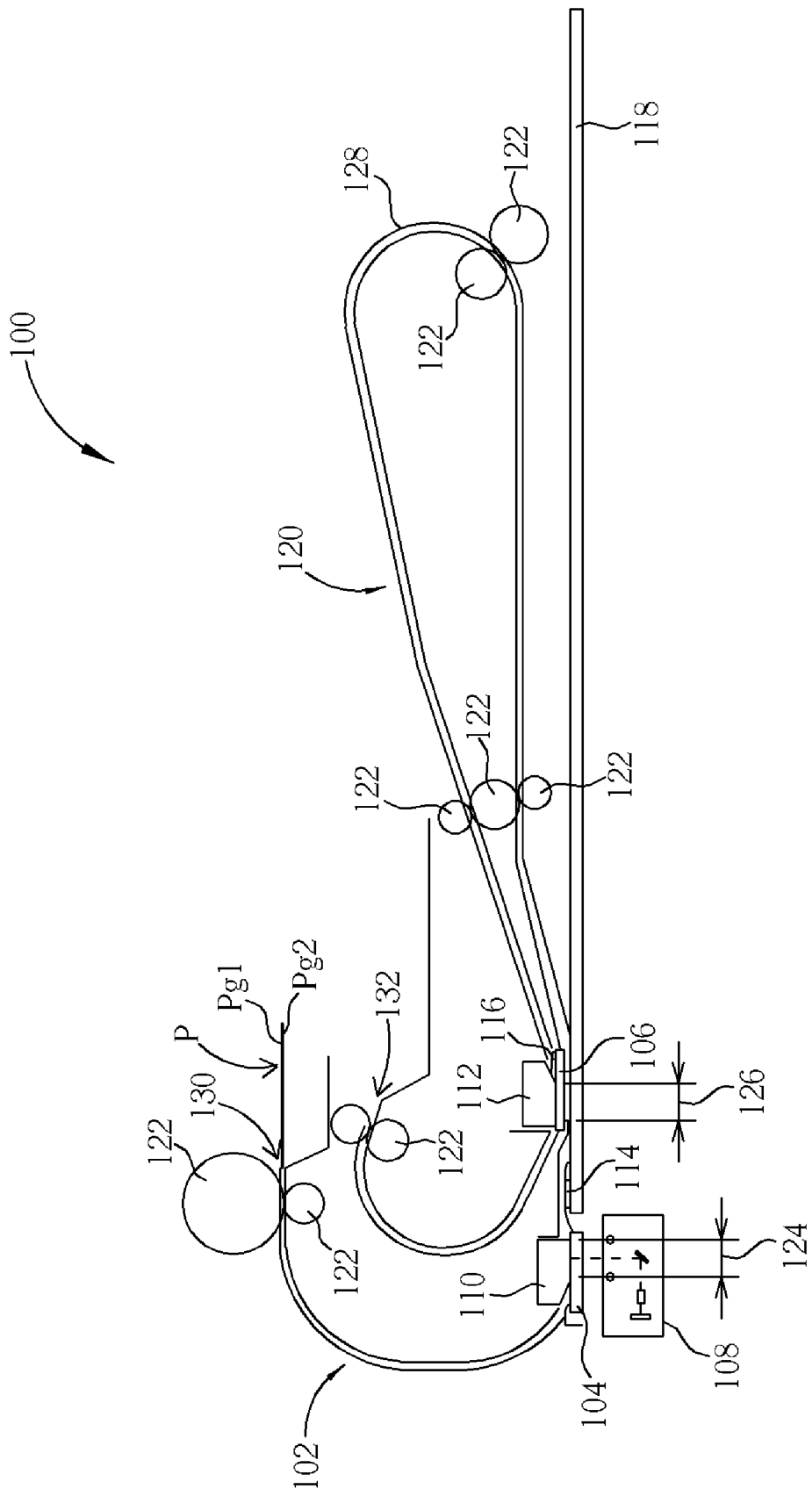
FIG. 1 shows a simplified diagram of a double-side scan device according to an embodiment of the present invention.

Please refer to FIG. 1. FIG. 1 shows a simplified diagram of a double-side scan device 100 according to an embodiment of the present invention. The double-side scan device 100 is utilized for capturing images of a first surface Pg1 and a second surface Pg2 of a document P, and conveying the document P outside the double-side scan device 100 in the end. Please note that the document P processed by the double-side scan device 100 is not limited to be a sheet of paper, and is meant to be any object capable of being scanned via the double-side scan device 100, such as a projection sheet.

As shown in FIG. 1, the double-side scan device 100 includes a document conveyer 102, a first transparent device 104, a second transparent device 106, an image scan module 108, a first press element 110, a second press element 112, a first calibration sheet 114, a second calibration sheet 116, and a scan flatbed 118. In this embodiment, the document conveyer 102 includes a document track 120, a plurality of conveying rollers 122 disposed in the document track 120, wherein the conveying rollers 122 are controlled by a motive power source (not shown) to roll according to a predetermined rotating direction (a clockwise direction or a counter-clockwise direction), so as to convey the document P along the document track 120.

The document track 120 includes a first scan area 124, a second area 126, a circumrotating area 128, an entrance port 130, and an exit port 132. The document P enters the document track 120 through the entrance port 130, and the first transparent device 104 is disposed in the first scan area 124 of the document track 120, and thus the first surface Pg1 of the document P faces the first transparent device 104 when the document conveyer 102 conveys the document P through the first scan area 124. Additionally, the second transparent device 106 is disposed in the second scan area 126 of the document track 120, and thus the second surface Pg2 of the document P faces the second transparent device 106 when the document conveyer 102 conveys the document P through the second scan area 126 after the document P passes the circumrotating area 128. Finally, the document P leaves the document track 120 through the exit port 132.

Figure 2:
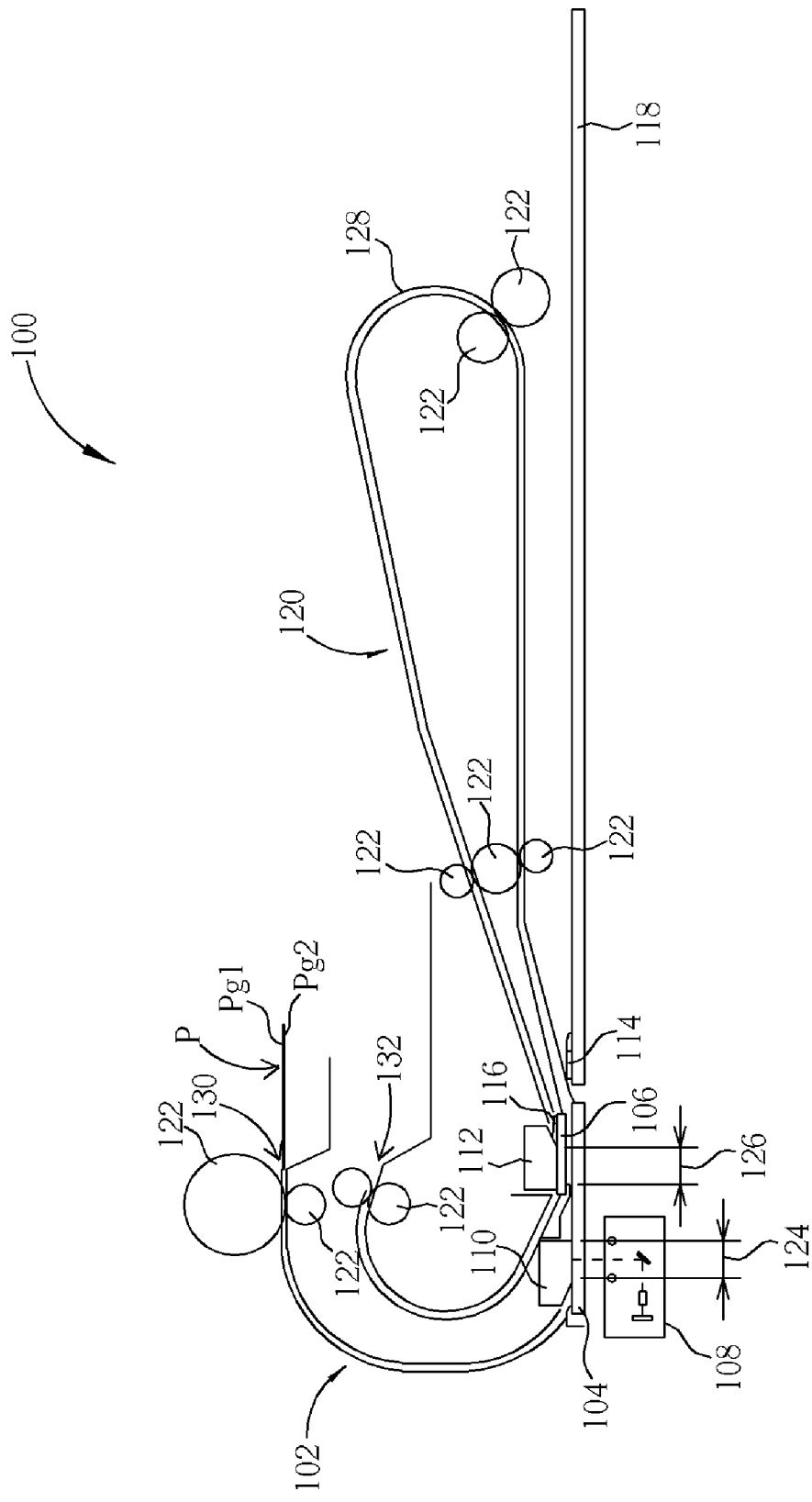
FIG. 2 shows a simplified diagram of a double-side scan device according to another embodiment of the present invention.

Additionally, positions of the first scan area 124 and the second scan area 126 are not overlapped, and thus the present invention can dispose the first press element 110 above the first transparent device 104, and also can dispose the second press element 112 above the second transparent device 106, so as to convey the document P stably to improve scan quality. Please note that although the positions of the first scan area 124 and the second scan area 126 are not overlapped for providing the optimal scan quality, the positions of the first transparent device 104 and the second transparent device 106 also can be designed to be disposed in an overlapping manner in another embodiment, as shown in FIG. 2.

Figure 3:
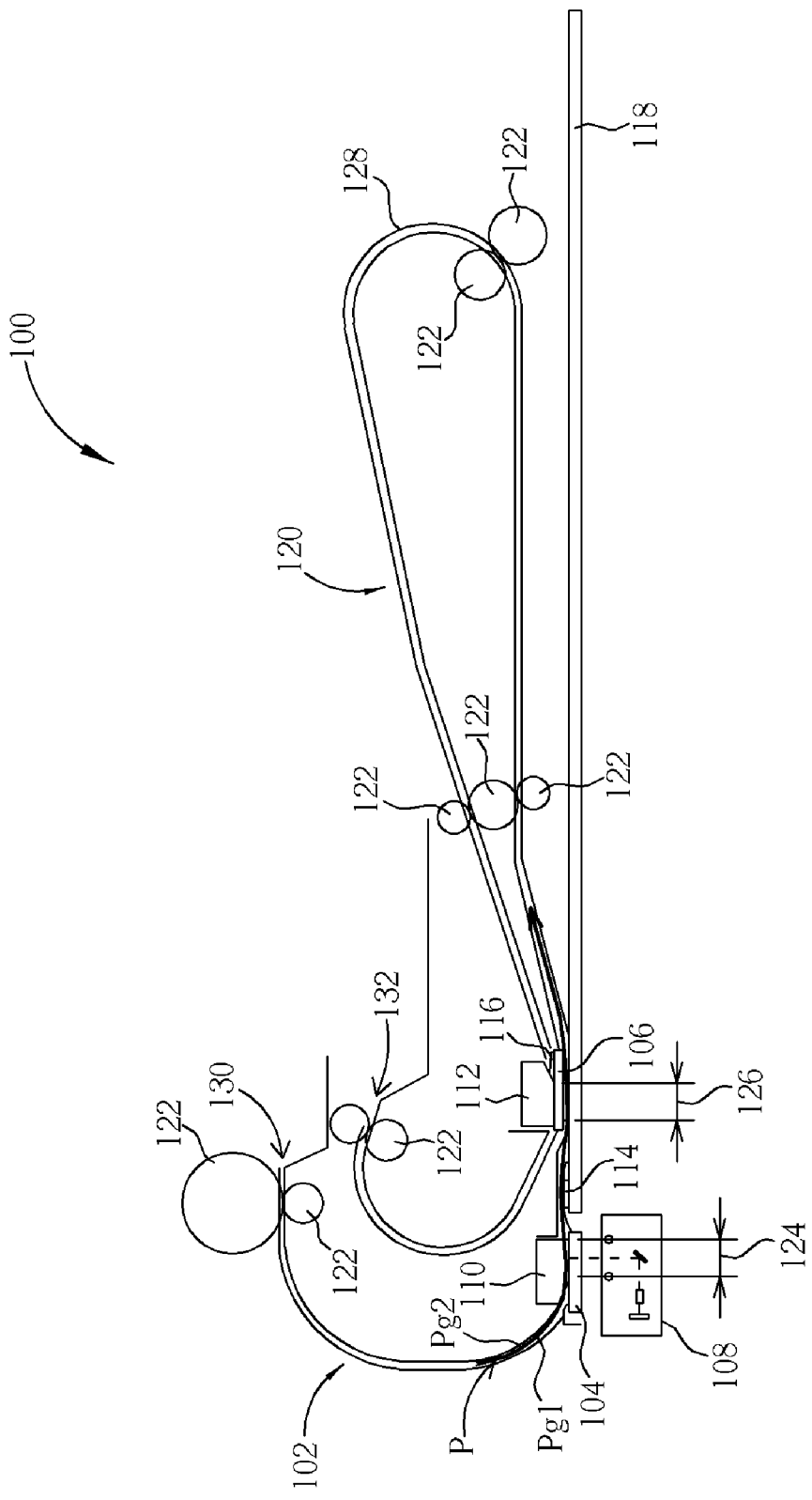
FIG. 3 is a simplified diagram showing the image scan module moves to one side of the first transparent device to capture the image of the first side/surface Pg1 in FIG. 1.
Figure 4:
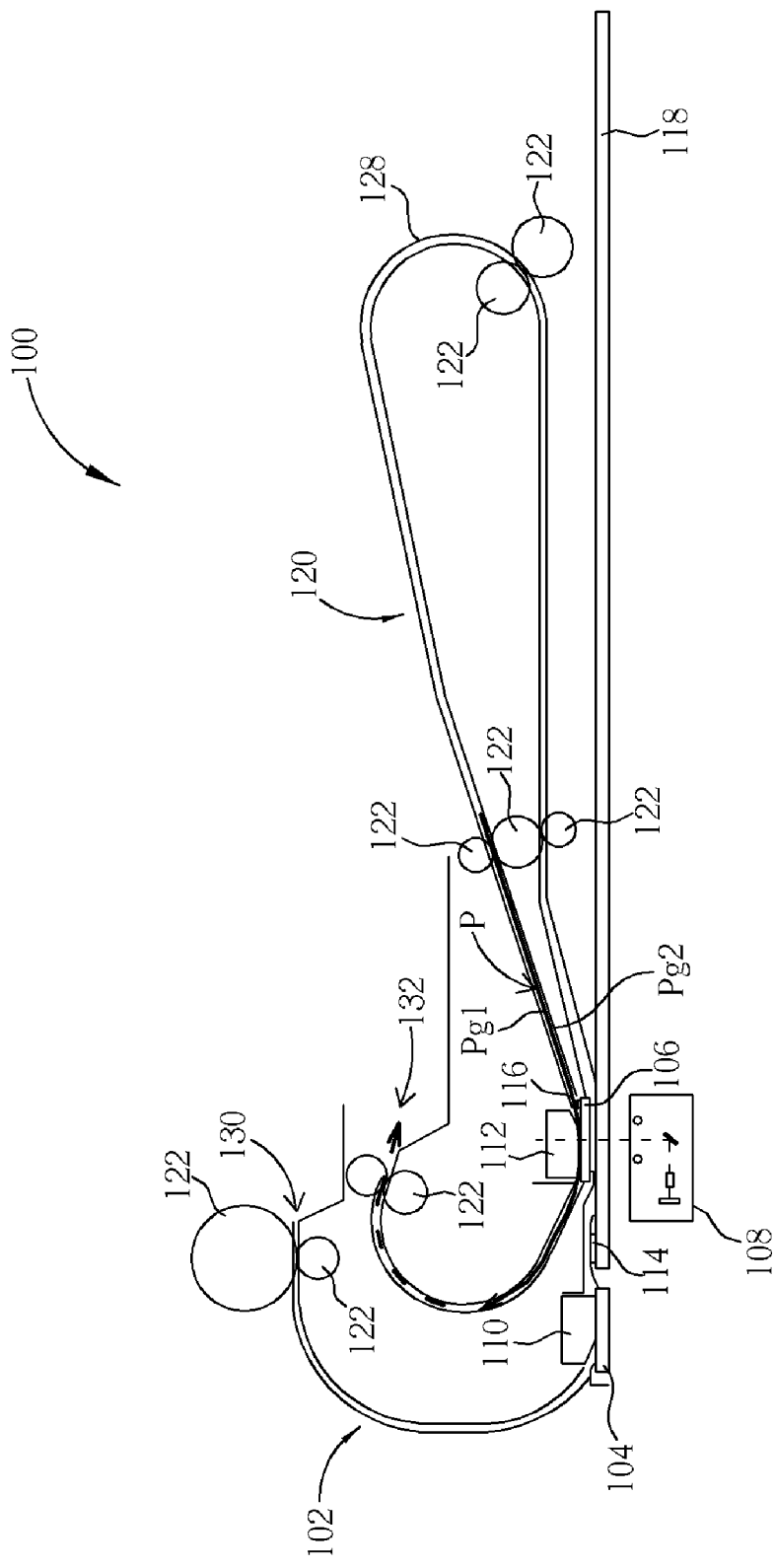
FIG. 4 is a simplified diagram showing the image scan module moves to one side of the second transparent device to capture the image of the second side/surface Pg2 in FIG. 1.

The image scan module 108 is disposed in the double-side scan device 100 with a movable scheme, i.e. the image scan module 108 moves to one side of the first transparent device 104 to capture the image of the first surface Pg1 (as shown in FIG. 3) and moves to one side of the second transparent device 106 to capture the image of the second surface Pg2 (as shown in FIG. 4), respectively. In this embodiment, the image scan module 108 can be a Charge-Coupled Device (CCD) or a Contact Image Sensor (CIS). However, this is only for an illustration purpose and is not meant to be a limitation of the present invention.

In addition, the first calibration sheet 114 corresponds to the image scan module 108, and the first calibration sheet 114 and a surface of the first transparent device 104 outside the document track 120 are disposed on a same level. The second calibration sheet 116 also corresponds to the image scan module 108, and the second calibration sheet 116 is disposed on a surface of the second transparent device 106 outside the document track 120. The first calibration sheet 114 and the second calibration sheet 116 are utilized for providing a color calibrating reference of the image scan calibration results, for the image scan module 108 to calibrate the image scan results. In addition, a focusing plane of the image scan module 108 has a limitation and its depth of field can not be too large, otherwise it will cause undesirable image scan results, and thus a height difference between the first transparent device 104 and the second transparent device 106 is preferred to be greater than 0 and not greater than 2 millimeters.

Briefly summarized, regardless of whether the double-side scan device 100 of the present invention performs a single-side or double-side scan operation, the document P moves continuously along a single path formed by the document track 120 without reversing a leading edge and a following edge of the document, and there is no repeating or interlacing path or requirement to move the document back and forth over the same section. Thus, the conveying rollers 122 need only to roll continuously in the predetermined rotating direction, and the document P can be conveyed and the first surface Pg1 and the second surface Pg2 can be reversed. Even when the conventional double-side scan device performs the single-side scan operation, the document still must pass through the track above the image scan area twice. Thus regardless of whether the scan operation is a single-side or double-side scan operation, only one document can be conveyed by the document conveyer in one time. Furthermore, the document conveyer must stop and reverse directions, and thus the conveying speed of the document conveyer is limited and the moving speed of the document will be decreased greatly. By contrast, whether the double-side scan device 100 of the present invention performs a single-side scan operation or a double-side scan operation, the document P moves continuously along the document track 120, and there is no repeating or interlacing path. Even when the double-side scan device 100 performs the single-side scan operation, as long as there is a proper interval between each document P, then a plurality of documents P can be conveyed along the document track 120, and the efficiency of the single-side scan operation will be improved greatly. When the double-side scan device 100 performs the double-side scan operation, since the conveying rollers 122 need only to roll continuously in the predetermined rotating direction, and then the first surface Pg1 and the second surface Pg2 can be reversed, and actions for stopping or reversing directions are not required. Thus, the double-side scan device 100 of the present invention still has a higher conveying speed than that of the conventional double-side scan device, and the order of all the documents are preserved when scanning a plurality of documents, and does not require the user to re-arrange them.

In addition, since the double-side scan device 100 of the present invention has a movable image scan module 108, and the positions of the first scan area 124 and the second scan area 126 are not overlapped, the present invention can dispose the first press element 110 above the first transparent device 104, and also can dispose the second press element 112 above the second transparent device 106, so as to convey the document P stably to improve the scan quality. In addition, since the double-side scan device 100 of the present invention only needs one image scan module to finish the double-side scan operation, thus it can reduce cost.

The double-side scan device disclosed by the present invention can applied in Multi-Function Printers (MFPs), scanners and printers. However, these are only for illustration purposes and are not meant to be limitations of the present invention.

Those skilled in the art will readily observe that numerous modifications and alterations of the device and method may be made while retaining the teachings of the invention.

What is claimed is:

1. A double-side scan device for conveying a document and capturing an image of the document, the document having a first surface and a second surface, the double-side scan device comprising:

a document conveyer, comprising a document track, the document track comprising a first scan area, a second scan area, and a circumrotating area, wherein the document conveyer conveys the document along a single path formed by the document track without reversing a leading edge and a following edge of the document;

a first transparent device, disposed in the first scan area of the document track, wherein the first surface of the document faces the first transparent device when the document conveyer conveys the document through the first scan area;

a second transparent device, disposed in the second scan area of the document track, wherein the second surface of the document faces the second transparent device when the document conveyer conveys the document through the second scan area after the document passes the circumrotating area; and an image scan module, disposed in the double-side scan device with a movable scheme, wherein the image scan module moves to one side of the first transparent device to capture the image of the first surface of the document and moves to one side of the second transparent device to capture the image of the second surface of the document respectively.

2. The double-side scan device of claim 1, wherein positions of the first scan area and the second scan area are not overlapped.

3. The double-side scan device of claim 1, further comprising:
a first press element, disposed in another side of the first transparent device in the first scan area.

4. The double-side scan device of claim 1, further comprising:
a second press element, disposed in another side of the second transparent device in the second scan area.

5. The double-side scan device of claim 1, wherein the document track has an entrance port and an exit port, the document enters the document track through the entrance port and leaves the document track through the exit port, and the document track passes through the first transparent device and the second transparent device.

6. The double-side scan device of claim 1, wherein a height difference between the first transparent device and the second transparent device is greater than 0 and not greater than 2 millimeters.

7. The double-side scan device of claim 1, further comprising:
a first calibration sheet, corresponding to the image scan module, the first calibration sheet and a surface of the first transparent device outside the document track being disposed on a same level; and
a second calibration sheet, corresponding to the image scan module, disposed on a surface of the second transparent device outside the document track.

8. The double-side scan device of claim 1, wherein the image scan module is a Charge-Coupled Device (CCD) or a Contact Image Sensor (CIS).

9. A double-side scan device for conveying a document and capturing an image of the document, the document having a first surface and a second surface, the double-side scan device comprising:
a document conveyer, comprising a document track, the document track comprising a first scan area, a second scan area, and a circumrotating area;
a first transparent device, disposed in the first scan area of the document track, wherein the first surface of the document faces the first transparent device when the document conveyer conveys the document through the first scan area;
a second transparent device, disposed in the second scan area of the document track, wherein the second surface of the document faces the second transparent device when the document conveyer conveys the document through the second scan area after the document passes the circumrotating area, and a height difference between the first transparent device and the second transparent device is greater than 0 millimeter; and
an image scan module, disposed in the double-side scan device with a movable scheme, wherein the image scan module moves to one side of the first transparent device to capture the image of the first surface of the document and moves to one side of the second transparent device to capture the image of the second surface of the document respectively.

10. The double-side scan device of claim 9, wherein positions of the first scan area and the second scan area are not overlapped.

11. The double-side scan device of claim 9, further comprising:
a first press element, disposed in another side of the first transparent device in the first scan area.

12. The double-side scan device of claim 9, further comprising:
a second press element, disposed in another side of the second transparent device in the second scan area.

13. The double-side scan device of claim 9, wherein the document track has an entrance port and an exit port, the document enters the document track through the entrance port and leaves the document track through the exit port, and the document track passes through the first transparent device and the second transparent device.

14. The double-side scan device of claim 9, wherein the height difference between the first transparent device and the second transparent device is not greater than 2 millimeters.

15. The double-side scan device of claim 9, further comprising:
a first calibration sheet, corresponding to the image scan module, the first calibration sheet and a surface of the first transparent device outside the document track being disposed on a same level; and
a second calibration sheet, corresponding to the image scan module, disposed on a surface of the second transparent device outside the document track.

16. The double-side scan device of claim 9, wherein the image scan module is a Charge-Coupled Device (CCD) or a Contact Image Sensor (CIS).

17. The double-side scan device of claim 9, wherein the document conveyer conveys the document along a single path formed by the document track without reversing a leading edge and a following edge of the document.

* * * * *